F. D. RAFORTH.
DISINFECTANT APPARATUS.
APPLICATION FILED FEB. 15, 1909.

926,961.

Patented July 6, 1909.

Witnesses.
D. W. Edelin
N. M. Down

Inventor
F. D. Raforth
by Veenie, Goldsborough & O'Neill
attys.

UNITED STATES PATENT OFFICE.

FREDERICK D. RAFORTH, OF DUBUQUE, IOWA, ASSIGNOR TO LORENZO O. HILLYARD, OF DUBUQUE, IOWA.

DISINFECTANT APPARATUS.

No. 926,961.　　　　Specification of Letters Patent.　　　　Patented July 6, 1909.

Application filed February 15, 1909. Serial No. 478,050.

*To all whom it may concern:*

Be it known that I, FREDERICK D. RAFORTH, a citizen of the United States, residing at Dubuque, in the county of Dubuque and State of Iowa, have invented certain new and useful Improvements in Disinfectant Apparatus; and I do hereby declare the following to be a full, clear, and exact description of the invention, such as will enable others skilled in the art to which it appertains to make and use the same.

The invention relates to improvements in portable disinfectant containers adapted to discharge the disinfectant, a drop at a time, into a closet, sink or other place to be disinfected and which will also admit of vaporization of a sufficient quantity of the disinfectant to purify the adjacent contaminated air.

Figure 1:
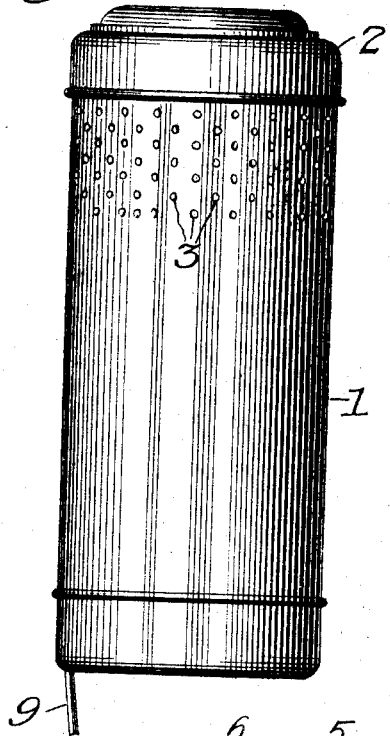
Figure 2:
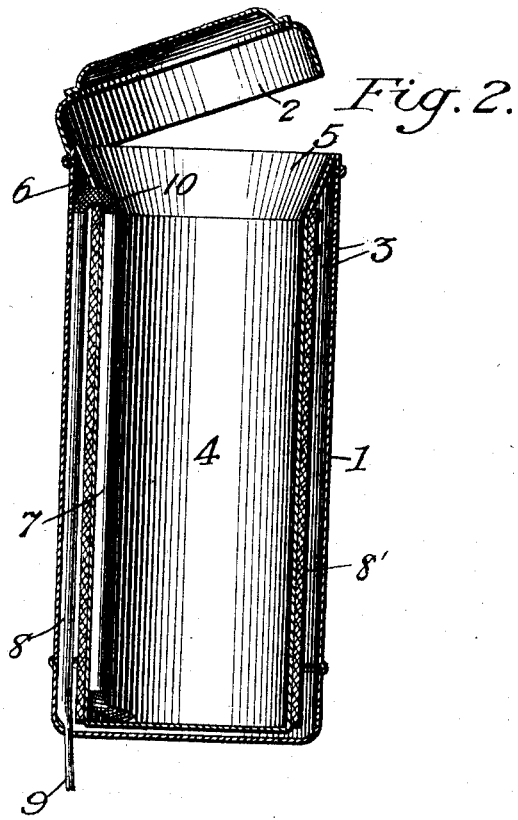
Figure 3:
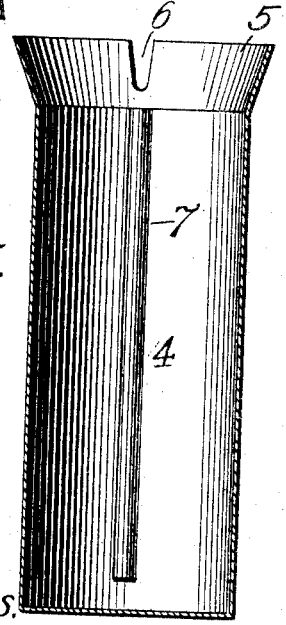
Figure 4:
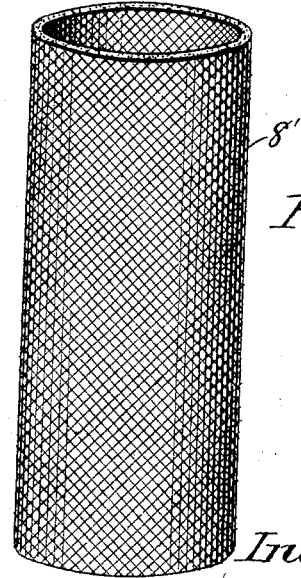

The invention is illustrated in the accompanying drawings, in which:

Figure 1 is a side elevation of the apparatus, Fig. 2 is a vertical transverse section through the same showing the lid open. Fig. 3 is a vertical section through the inner disinfectant containing vessel, and Fig. 4 is a perspective view of the absorbent mantle which surrounds the inner vessel.

Referring to the drawings, 1 indicates an outer casing of metal or other suitable material provided with a closed bottom and having a series of perforations 3, disposed about its upper portion.

2 is the hinged lid or cover adapted to close the casing. Any suitable means may be provided in connection with the casing for securing the same in position above a closet, sink, or the like.

Located centrally within the casing 1, is a generally cylindrical imperforate vessel 4, provided with a flaring flange 5, at its upper end adapted to center said vessel 4, within the casing 1, so as to leave an annular space between the walls of the two vessels. The vessel 4 is imperforate as to its body portion and is adapted to contain a quantity of disinfectant in liquid form. Enveloping the cylindrical exterior of the vessel 4 is a mantle 8′ of absorbent material, adapted to take up and hold a quantity of liquid and give the same off slowly by evaporation. It will be noted that while the mantle 8′ surrounds the inner vessel 4, there is still left a considerable space between the outer casing and the mantle to admit of circulation of air in the casing and the resultant evaporation and escape of the disinfectant through the openings 3, in the casing 1.

Secured to the inner wall of the vessel 4 is a tube 7, and adjacent to the upper end of this tube, the rim 5 of the vessel 4 is notched out as at 6. Upon the interior wall of the casing 1 there is mounted a tube 8, the lower end of which is contracted and passes through the bottom of the casing 1, in the form of a drip nozzle 9. Passing through the tube 7, so that its lower end extends to the bottom of the vessel 4, is an absorbent wick 10, which passes through the notch 6, and thence into the tube 8, the intermediate portion of the wick, where the same passes through the notch 6, engaging the edge of the absorbent mantle 8′ as clearly indicated in Fig. 2.

The operation of the device as hereinbefore described, is as follows: When the disinfecting fluid is poured into the inner vessel 4, the wick 10 becomes saturated with the fluid and conveys the same by capillary action upward through the tube 7, and thence downward through tube 8, whence it is discharged in the form of drops from the discharge nozzle 9. Since the tube 8 and its drip nozzle 9 are somewhat longer than tube 7, and the nozzle 9 is lower than the intake end of tube 7, the two tubes and the wick produce a siphoning effect in withdrawing the disinfectant from vessel 4. Inasmuch as the wick 10 where it passes through tube 7, into the tube 8 engages the mantle 8′, the latter is kept saturated with the disinfectant, but does not take up sufficient liquid to cause the latter to accumulate in the bottom of the casing 1. On the other hand, the large exterior surface of the mantle 8′ permits a free evaporation of the disinfectant absorbed by said mantle, the vapors passing off through the openings 3. It has been found that the space between the casing 1 and the inner vessel 4 does not, under any conditions of use, become filled with the disinfecting liquid, for the reason that the siphoning effect of the wick 10 in the outer tube produces a sufficient draft to prevent an excess of fluid passing to mantle 8′, thereby leaving practically all of the surface of the mantle exposed to the air for causing an efficient evaporation of the disinfectant.

What I claim is:—

1. In a disinfecting device, the combination of an outer casing perforated in its upper portion, an inner imperforate liquid containing vessel, an absorbent mantle enveloping said inner vessel, a drip tube in the outer casing, and a wick having its ends within the inner vessel and the drip tube respectively, and an intermediate portion in engagement with said mantle.

2. In a disinfecting device, the combination of an outer casing perforated in its upper portion, a liquid containing vessel centrally spaced within the outer casing to provide an annular space within the latter, a tubular absorbent mantle enveloping the inner vessel, a drip tube in the outer casing, and a wick having its ends within the inner vessel and the drip tube respectively, and an intermediate portion in engagement with said mantle.

3. In a disinfecting device, the combination of an outer casing perforated in its upper portion, a liquid containing vessel centrally spaced within the outer casing to provide an annular space within the latter, a tubular absorbent mantle enveloping the inner vessel, a drip tube in the outer casing, a wick retaining tube in the inner vessel, and a wick passing through said wick tube and into said drip tube with the portion between said tubes in engagement with said mantle.

4. In a disinfecting device, the combination of a perforate outer casing, an inner imperforate liquid-containing vessel, an absorbent mantle enveloping said inner vessel, and means which transmits the liquid from the inner vessel to the mantle at the exterior of said vessel and from which the liquid drips directly out of the casing.

5. In a disinfecting device, the combination of a perforate casing, an inner liquid-containing vessel, an absorbent mantle located in the space between said casing and vessel and isolated from the body of liquid in the latter, and means which transmits the liquid from said vessel to the mantle at the upper portion of the latter and from which the liquid drips out of the casing.

6. In a disinfecting device, the combination of a perforate outer casing, an inner imperforate liquid-containing vessel, an absorbent mantle enveloping said vessel, an upright drip tube in the outer casing leading out of the latter, and a wick which enters the liquid vessel, lies across the upper edge of said mantle, and discharges into said drip tube.

In testimony whereof I affix my signature, in presence of two witnesses.

FRED. D. RAFORTH.

Witnesses:
   LOUIS TRUEB,
   C. H. FUGENBAUM.